United States Patent
You et al.

(10) Patent No.: US 9,408,057 B2
(45) Date of Patent: Aug. 2, 2016

(54) ACCOUNTING METHOD AND DEVICE

(71) Applicant: ZTE Corporation, Shenzhen (CN)

(72) Inventors: Jianjie You, Shenzhen (CN); Huaibin Wang, Shenzhen (CN); Liang Fan, Shenzhen (CN); Chunhui Zhu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 14/422,468

(22) PCT Filed: Aug. 19, 2013

(86) PCT No.: PCT/CN2013/081740
§ 371 (c)(1),
(2) Date: Feb. 19, 2015

(87) PCT Pub. No.: WO2014/029307
PCT Pub. Date: Feb. 27, 2014

(65) Prior Publication Data
US 2015/0223041 A1 Aug. 6, 2015

(30) Foreign Application Priority Data
Aug. 24, 2012 (CN) .......................... 2012 1 0305212

(51) Int. Cl.
*H04M 11/00* (2006.01)
*H04W 4/24* (2009.01)
*H04L 12/14* (2006.01)
*H04W 12/06* (2009.01)
*H04L 29/06* (2006.01)

(52) U.S. Cl.
CPC ................. *H04W 4/24* (2013.01); *H04L 12/14* (2013.01); *H04L 12/1403* (2013.01); *H04L 12/1467* (2013.01); *H04L 63/0892* (2013.01); *H04W 12/06* (2013.01)

(58) Field of Classification Search
CPC ........ H04W 4/24; H04W 12/06; H04L 12/14; H04L 12/1467; H04L 12/1403
USPC ......................................................... 455/432.1
See application file for complete search history.

(56) References Cited

U.S. PATENT DOCUMENTS

2009/0209229 A1* 8/2009 Cai ...................... H04L 12/1403
455/406

FOREIGN PATENT DOCUMENTS

| CN | 1852135 A | 10/2006 | |
| CN | 101282225 A | * 10/2008 | .............. H04L 12/14 |

OTHER PUBLICATIONS

International Search Report for corresponding application PCT/CN2013/081740 filed Aug. 19, 2013; Mail date Nov. 28, 2013.

*Primary Examiner* — Tanmay Shah
(74) *Attorney, Agent, or Firm* — Cantor Colburn LLP

(57) ABSTRACT

An accounting method and device are disclosed in the disclosure. The method includes that: a BNG transmits a second Accounting-Request message to an AAA server after receiving a first Accounting-Request message from an AC, wherein the first Accounting-Request message is used for activating the BNG to execute an accounting operation; and the BNG transmits a second Accounting-Stop message to the AAA server after receiving a first Accounting-Stop message from the AC, wherein the first Accounting-Stop message is used for activating the BNG to stop the accounting operation. By the disclosure, the problem that the function division of the AC and the BNG is not yet clear during the accounting operation in the related art is solved, so that functions of the AC and the BNG are clearly divided during the accounting operation, an accounting operation flow is further made clear, and the accounting efficiency is improved.

13 Claims, 7 Drawing Sheets

ACCOUNTING METHOD AND DEVICE

FIELD

The disclosure relates to the field of communication, including, e.g., an accounting method and device.

BACKGROUND

Along with the increasing maturity and popularization of a Wireless Local Area Network (WLAN) access technology, and a requirement of a user on high-speed wireless access, operators at home and abroad are striving to develop WLAN services. As 2nd Generation (2G) and 3rd Generation (3G) splitting means, the WLAN services play a more and more important role. The WLAN access technology belongs to a complementary access mode of a fixed network, and how to effectively master and manage an access condition of the user through the WLAN in real time becomes a key for the development of a WLAN value-added service. Meanwhile, the network optimization can be facilitated by the operators.

FIG. 1 is a diagram of a networking scenario of a WLAN according to a related art, and as shown in FIG. 1, the WLAN mainly includes User Equipment (UE), an Access Point (AP), an Access Controller (AC), a Broadband Network Gateway (BNG) and an Authentication Authorization Accounting (AAA) server. Under the scenario shown in FIG. 1, the UE is an 802.1X client, the AP is a wireless AP provided for the UE to access a wired network, the AC is used to manage the AP and transmit a data configuration to the AP, and simultaneously serves as an 802.1X authenticator and a Remote Authentication Dial In Service (RADIUS) client, the BNG is a RADIUS proxy, and the AAA server is a RADIUS server.

In the related art, under an interaction architecture between the WLAN access network and a fixed network, the UE needs to be authenticated before an accounting operation of the AC and the BNG. A UE authentication flow based on the scenario shown in FIG. 1 is introduced below, FIG. 2 is a flowchart of UE authentication according to the related art, and the UE is attached to the fixed network, and is subjected to access authentication. The UE authentication flow includes the following steps that (Step 202-Step 226):

Step 202: the UE transmits an Extensible Authentication Protocol over LAN (EAPoL)-Start message to the AC to start 802.1X access authentication;

Step 204: the AC transmits an EAP-Identity-Request message to the UE to request the UE to report a user identity;

Step 206: the UE returns an EAP-Identity-Response message to the AC, wherein the EAP-Identity-Response message includes the user identity;

Step 208: the AC encapsulates a received EAP frame into a RADIUS-Access-Request message, and transmits the RADIUS-Access-Request message to the BNG; and meanwhile, the AC adds a Media Access Control (MAC) address of the UE into the RADIUS-Access-Request message;

Step 210: the BNG, as the RADIUS proxy, transmits the RADIUS-Access-Request message to the RADIUS AAA server;

Step 212: the RADIUS AAA server returns a RADIUS-Access-Response message, wherein RADIUS-Access-Response message includes EAP Challenge;

Step 214: the BNG forwards the RADIUS-Access-Response message to the AC;

Step 216: the AC decapsulates the EAP frame, and transmits the EAP frame to the UE, and the UE gives a response, wherein a response message includes a Challenged Password;

Step 218: the AC encapsulates the received EAP frame into the RADIUS-Access-Request message, and transmits the RADIUS-Access-Request message, wherein the RADIUS-Access-Request message includes the Challenged Password;

Step 220: the BNG forwards the RADIUS-Access-Request message to the AAA server;

Step 222: if the UE is successfully authenticated, the Broadband Forum (BBF) AAA server returns a RADIUS-Access-Accept message;

Step 224: the BNG stores the user identity and MAC address of the UE, and forwards the RADIUS-Access-Accept message to the AC; and Step 226: the AC decapsulates the EAP frame, and transmits an EAP-Success message to the UE, and the authentication of the UE is completed.

In the related art, under the interaction architecture between the WLAN network and the fixed network, the function division of the AC and the BNG in an accounting flow is not yet clear, and there is no better solution particularly for how to trigger accounting under the scenario shown in FIG. 1.

For the problem that the function division of the AC and the BNG during the accounting operation in the related art is not yet clear, there is yet no effective solution.

SUMMARY

For the problem that the function division of an AC and a BNG is not yet clear during an accounting operation in the related art, an accounting method and device are provided in the disclosure, so as to at least solve the problem.

According to one aspect of the disclosure, an accounting method is provided, and the method includes that: a BNG transmits a second Accounting-Request message to an AAA server after receiving a first Accounting-Request message from an AC, wherein the first Accounting-Request message is used for activating the BNG to execute an accounting operation; and the BNG transmits a second Accounting-Stop message to the AAA server after receiving a first Accounting-Stop message from the AC, wherein the first Accounting-Stop message is used for activating the BNG to stop the accounting operation.

Before the BNG receives the first Accounting-Stop message transmitted by the AC, the method can further include that: the AC receives a logoff notification message from a UE.

After the BNG transmits the second Accounting-Request message to the AAA server, the method can further include that: the BNG transmits an Accounting-Response message to the AC.

Before the BNG receives the first Accounting-Stop message transmitted by the AC, the method can further include that: the BNG executes the accounting operation according to an accounting strategy, and reports intermediate accounting data to the AAA server.

The step that the BNG executes the accounting operation according to the accounting strategy can include that: the BNG receives a new accounting strategy transmitted by the AAA server, and executes the accounting operation according to the new accounting strategy.

After the BNG receives the first Accounting-Stop message transmitted by the AC, the method can further include that: the BNG deletes the accounting strategy.

In case of absence of Network Address Port Translation (NAPT) on the AC, at least one of the following is carried in the first Accounting-Request message or the second Accounting-Request message: an Internet Protocol (IP) address of the UE, a user identity of the UE, a MAC address of the UE; and in case of presence of NAPT on the AC, at least one of the following is carried in the first Accounting-Request message or the second Accounting-Request message: a public IP address and port set of the UE, a user identity of the UE, a MAC address of the UE.

In case of absence of NAPT on the AC, at least one of the following is carried in the first Accounting-Stop message or the second Accounting-Stop message: an IP address of a UE, a user identity of the UE, a MAC address of the UE; and in case of presence of NAPT on the AC, at least one of the following is carried in the first Accounting-Stop message or the second Accounting-Stop message: a public IP address and port set of the UE, a user identity of the UE, a MAC address of the UE.

According to the other aspect of the disclosure, an accounting device is provided, and the accounting device includes: a first message processing component, configured to transmit a second Accounting-Request message to an AAA server after receiving a first Accounting-Request message from an AC, wherein the first Accounting-Request message is used for activating a BNG to execute an accounting operation; and a second message processing component, configured to transmit a second Accounting-Stop message to the AAA server after receiving a first Accounting-Stop message from the AC, wherein the first Accounting-Stop message is used for activating the BNG to stop the accounting operation.

The device can further include: an accounting-Response message transmission component, configured to transmit an Accounting-Response message to the AC.

The device can further include: an accounting component, configured to execute the accounting operation according to an accounting strategy; and a data reporting component, configured to report intermediate accounting data to the AAA server.

The accounting component can include: an accounting element, configured to receive a new accounting strategy from the AAA server and execute the accounting operation according to the new accounting strategy.

The device can further include: a deleting component, configured to delete the accounting strategy.

In case of absence of NAPT on the AC, at least one of the following is carried in the first Accounting-Request message or the second Accounting-Request message: an IP address of a UE, a user identity of the UE, a MAC address of UE; and in case of presence of NAPT on the AC, at least one of the following is carried in the first Accounting-Request message or the second Accounting-Request message: a public IP address and port set of the UE, a user identity of the UE, a MAC address of the UE.

In case of absence of NAPT on the AC, at least one of the following is carried in the first Accounting-Stop message or the second Accounting-Stop message: an IP address of the UE, a user identity of the UE, a MAC address of the UE; and in case of presence of NAPT on the AC, at least one of the following is carried in the first Accounting-Stop message or the second Accounting-Stop message: a public IP address and port set of the UE, a user identity of the UE, a MAC address of the UE.

According to the disclosure, the BNG transmits the second Accounting-Request message to the AAA server after receiving the first Accounting-Request message from the AC, then executes the accounting operation, and transmits the second Accounting-Stop message to the AAA server after receiving the first Accounting-Stop message from the AC, wherein the first Accounting-Request message is used for activating the BNG to execute the accounting operation; and the first Accounting-Stop message is used for activating the BNG to stop the accounting operation. The problem that the function division of the AC and the BNG is not yet clear during the accounting operation in the related art is solved, so that functions of the AC and the BNG are clearly divided during the accounting operation, an accounting operation flow is further made clear, and the accounting efficiency is improved.

BRIEF DESCRIPTION OF THE DRAWINGS

The drawings are described here to provide further understanding of the disclosure, and form a part of the disclosure. The schematic embodiments and description of the disclosure are adopted to explain the disclosure, and do not form improper limits to the disclosure. In the drawings.

DETAILED DESCRIPTION OF THE EMBODIMENTS

The disclosure is described below with reference to the drawings and embodiments in detail. It is important to note that the embodiments of the disclosure and the characteristics in the embodiments can be combined under the condition of no conflicts.

In order to make clear the function division of an AC and a BNG in an accounting operation flow, an accounting method and device are provided in the embodiments of the disclosure, which are specifically introduced below with reference to the embodiments.

Figure 1:
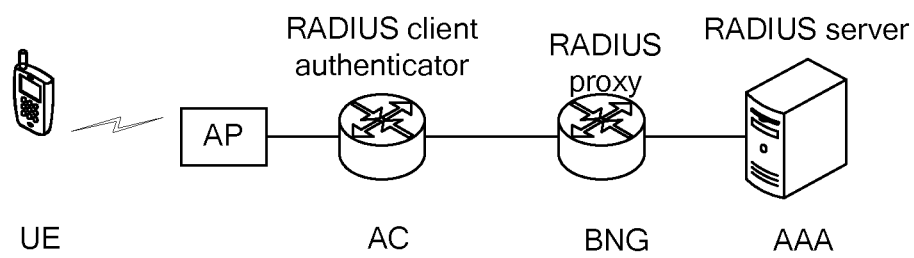
FIG. 1 is a diagram of a networking scenario of a WLAN according to the related art.
Figure 2:
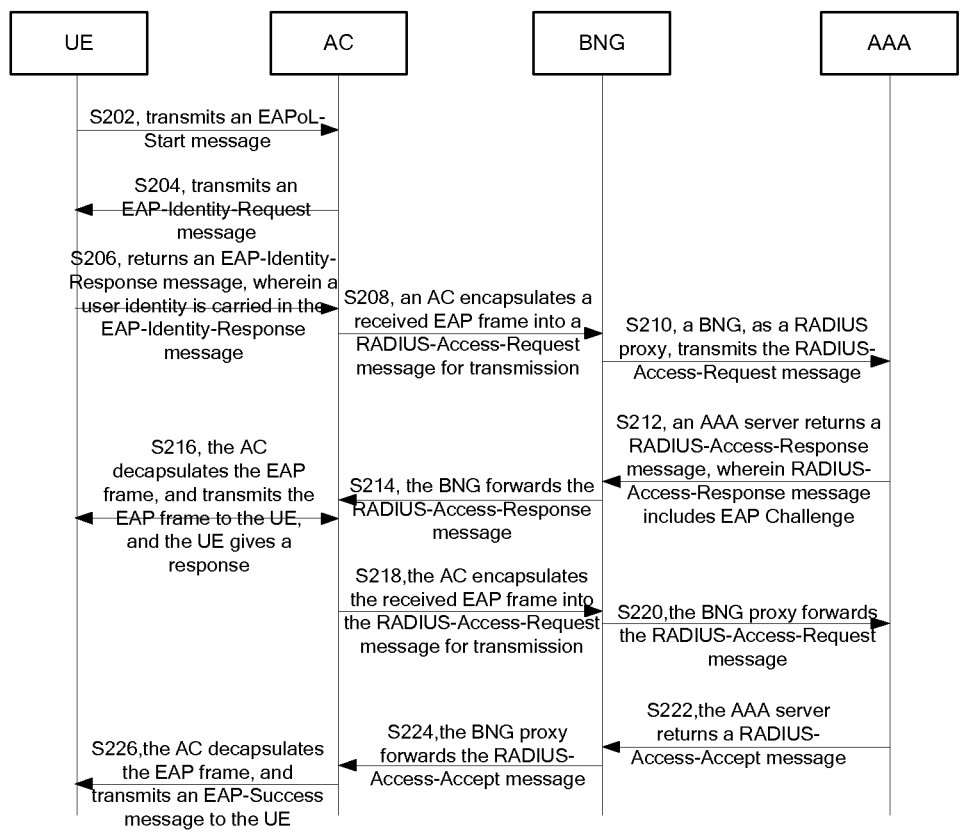
FIG. 2 is a flowchart of UE authentication according to the related art.
Figure 3:
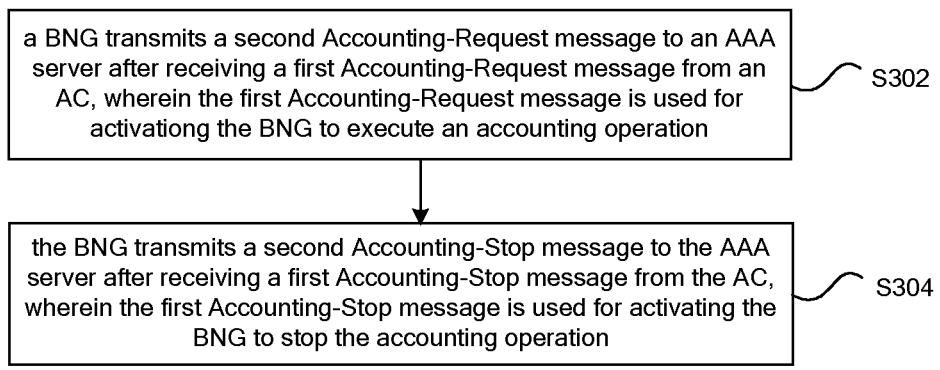
FIG. 3 is a flowchart of an accounting method according to an embodiment of the disclosure.

FIG. 3 is a flowchart of an accounting method according to an embodiment of the disclosure, and as shown in FIG. 3, the method includes the following steps that (Step 302-Step 304):

Step 302: a BNG transmits a second Accounting-Request message to an AAA server after receiving a first Accounting-Request message transmitted by an AC, wherein the first Accounting-Request message is used for activating the BNG to execute an accounting operation; and Step 304: the BNG transmits a second Accounting-Stop message to the AAA server after receiving a first Accounting-Stop message transmitted by the AC, wherein the first Accounting-Stop message is used for activating the BNG to stop the accounting operation.

By the method, the AC only serves as a triggering factor for the starting and stopping the accounting operation, and the BNG transmits the second Accounting-Request message to the AAA server after receiving the first Accounting-Request message from the AC, then executes the accounting operation, and transmits the second Accounting-Stop message to the AAA server after receiving the first Accounting-Stop message from the AC, wherein the first Accounting-Request message is used for activating the BNG to execute the accounting operation; and the first Accounting-Stop message is used for activating the BNG to stop the accounting operation. The problem that the function division of the AC and the BNG is not yet clear during the accounting operation in the related art is solved, so that the functions of the AC and the BNG are clearly divided during the accounting operation, an accounting operation flow is further made clear, and the accounting efficiency is improved.

In the embodiment, the AC does not participate in substantial accounting data collection and reporting, and only serves as the triggering factor for the starting and stopping the accounting operation, that is, there is no accounting strategy for UE on the AC. An accounting starting process and an accounting stop process are respectively introduced below.

The accounting starting process is specifically as follows: the BNG transmits the second Accounting-Request message to the AAA server after receiving the first Accounting-Request message from the AC, and starts user accounting. Before the BNG receives the first Accounting-Stop message from the AC, the AC receives a logoff notification message from a UE, and then transmits the first Accounting-Stop message to the BNG. Preferably, the BNG returns an Accounting-Response message to the AC after transmitting the second Accounting-Request message to the AAA server.

In case of absence of NAPT on the AC, at least one of the following is carried in the first Accounting-Request message transmitted to the BNG by the AC: an IP address of a UE, a user identity of the UE, a MAC address of the UE; and in case of presence of NAPT on the AC, at least one of the following is carried in the first Accounting-Request message transmitted to the BNG by the AC: a public IP address and port set of the UE, a user identity of the UE, a MAC address of the UE. The BNG generates the second Accounting-Request message for the UE after receiving the first Accounting-Request message from the AC, and transmits the second Accounting-Request message to the AAA server. In case of absence of NAPT on the AC, at least one of the following is carried in the second Accounting-Request message: an IP address of the UE, a user identity of the UE, a MAC address of the UE; and in case of presence of NAPT on the AC, at least one of the following is carried in the second Accounting-Request message transmitted to the AAA server by the BNG: a public IP address and port set of the UE, a user identity of the UE, a MAC address of the UE.

After that, the BNG starts executing the accounting operation, and specifically, the BNG executes the accounting operation according to an accounting strategy, and is responsible for collecting accounting data and reporting intermediate accounting data to the AAA server. In the meantime, the AC may report the intermediate accounting data to the BNG, and in the embodiment, the BNG may select to neglect the intermediate accounting data reported by the AC. The accounting strategy required by the accounting operation of the BNG is transmitted by the AAA server, and after the AAA server transmits a new accounting strategy, the BNG performs strategy updating, and executes the accounting operation according to the new accounting strategy. Based on the above, a preferred implementation mode is provided in the embodiment, that is, the step that the BNG executes the accounting operation according to the accounting strategy includes that: the BNG receives the new accounting strategy transmitted by the AAA server, and executes the accounting operation according to the new accounting strategy. Therefore, the BNG can in time adopt the latest accounting strategy for the accounting operation, thus optimizing the accounting flow. The BNG deletes the accounting strategy after receiving the first Accounting-Stop message from the AC.

The accounting stop process is specifically as follows: the AC transmits the first Accounting-Stop message to the BNG after receiving the EAP logoff notification message from the UE. The BNG transmits the second Accounting-Stop message to the AAA server after receiving the first Accounting-Stop message from the AC, and the first Accounting-Stop message transmitted by the AC is used for activating the stop of user accounting.

In case of absence of NAPT on the AC, at least one of the following is carried in the first Accounting-Stop message transmitted to the BNG by the AC: the IP address of a UE, the user identity of UE, the MAC address of the UE; and in case of presence of NAPT on the AC, at least one of the following is carried in the first Accounting-Stop message transmitted to the BNG by the AC: the public IP address and port set of the UE, the user identity of the UE, the MAC address of the UE. The BNG generates the second Accounting-Stop message for the UE after receiving the first Accounting-Stop message from the AC, and transmits the second Accounting-Stop message to the AAA server. In case of absence of NAPT on the AC, at least one of the following is carried in the second Accounting-Stop message: the IP address of the UE, the user identity of the UE, the MAC address of the UE; and in case of presence of NAPT on the AC, at least one of the following is carried in the second Accounting-Stop message transmitted to the AAA server by the BNG: the public IP address and port set of the UE, the user identity of the UE, the MAC address of the UE.

Before starting the accounting, the UE is required to be authenticated at first, and after the UE passes authentication, the subsequent accounting operation is executed. Accounting starting flows for different authentication processes are respectively introduced below.

Figure 4:
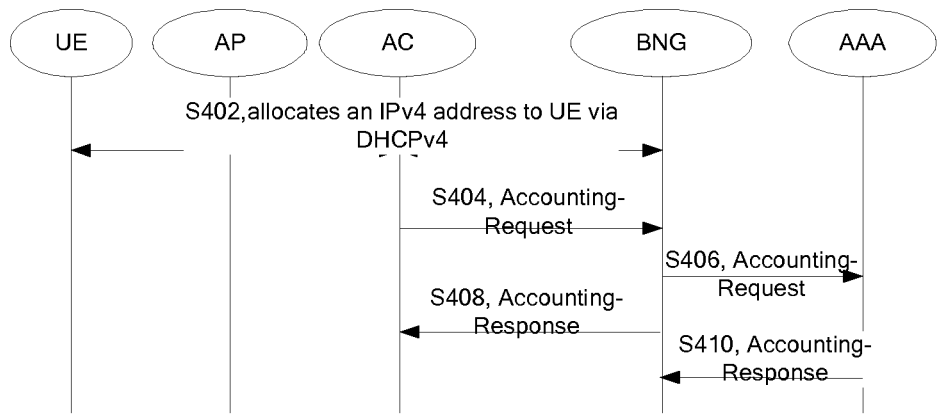
FIG. 4 is a flowchart of an accounting starting flow based on the IP address allocation of a BNG according to an embodiment of the disclosure.

FIG. 4 is a flowchart of an accounting starting flow based on that the IP address is allocated by the BNG according to an embodiment of the disclosure, and as shown in FIG. 4, the flow includes the following steps that (Step 402-Step 410):

Step 402: UE initiates a Dynamic Host Configuration Protocol version 4 (DHCPv4) address request, an AC supports a DHCP Relay function and forwards the address request to the BNG, and the BNG supports a DHCP Server function and allocates an IPv4 address to the UE.

Specifically, the AC judges whether the UE passes authentication or not according to the MAC address carried in the address request, and forwards the address request to the BNG if the UE passes authentication; or, the AC does not authenticate the UE, and directly forwards the address request from the UE to the BNG, and the BNG judges whether the UE passes authentication or not according to the MAC address carried in the address request, and allocates the IP address to the UE if the UE passes authentication.

Step 404: after the address is successfully allocated, the AC initiates an Accounting-Request message, and transmits the Accounting-Request message to the BNG, wherein at least one of the following is carried in the Accounting-Request message: the IP address of the UE, the user identity of the UE, the MAC address of the UE.

Step 406: the BNG generates a new Accounting-Request message for the UE after receiving the Accounting-Request message from the AC, and transmits the new Accounting-Request message to an AAA server.

Step 408: the BNG returns an Accounting-Response message to the AC. Step 406 and Step 408 can be executed in an unfixed sequence.

Step 410: the AAA server returns an Accounting-Response message to the BNG, and accounting is started.

Figure 5:
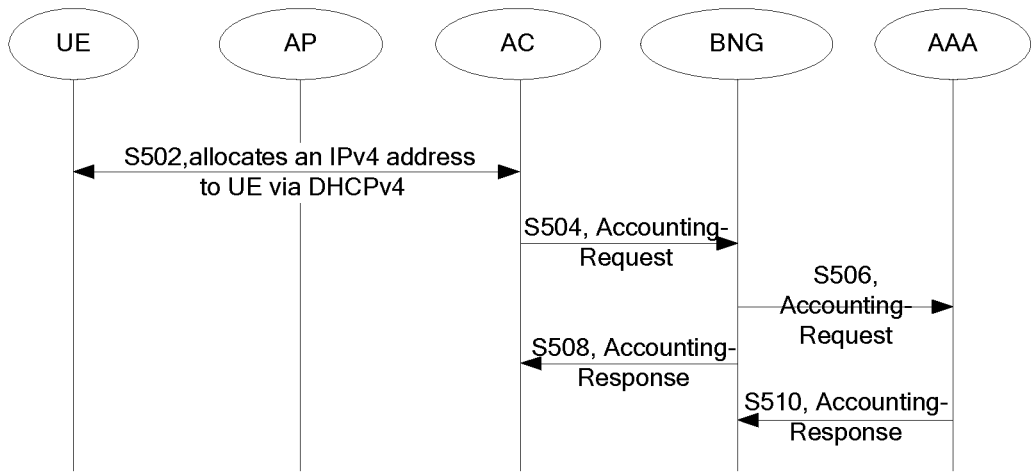
FIG. 5 is a flowchart of an accounting starting flow based on the IP address allocation of an AC according to an embodiment of the disclosure.

FIG. 5 is a flowchart of an accounting starting flow based on that the IP address is allocated by the AC according to an embodiment of the disclosure, and as shown in FIG. 5, the flow includes the following steps that (Step 502-Step 510):

Step 502: UE initiates a DHCPv4 address request, and the AC supporting a DHCP Server function allocates an IPv4 address to the UE.

Specifically, the AC judges whether the UE passes authentication or not according to the MAC address carried in the address request, and allocates the IP address to the UE if the UE passes authentication.

Step 504: after the address is successfully allocated, the AC initiates an Accounting-Request message, and transmits the Accounting-Request message to a BNG, wherein at least one of the following is carried in the Accounting-Request message: the IP address of the UE, the user identity of the UE, the MAC address of the UE.

Step 506: the BNG generates a new Accounting-Request message for the UE after receiving the Accounting-Request message from the AC, and transmits the new Accounting-Request message to an AAA server.

Step 508: the BNG returns an Accounting-Response message to the AC. Step 506 and Step 508 can be executed in an unfixed sequence.

Step 510: the AAA server returns an Accounting-Response message to the BNG, and accounting is started.

Figure 6:
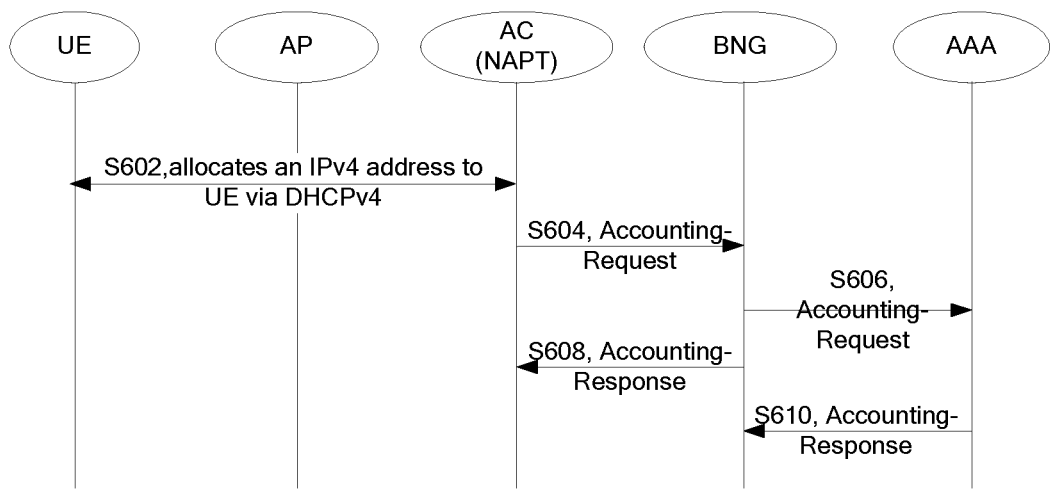
FIG. 6 is a flowchart of another accounting starting flow based on the IP address allocation of an AC according to an embodiment of the disclosure.

FIG. 6 is a flowchart of another accounting starting flow based on that the IP address is allocated by the AC according to an embodiment of the disclosure, and as shown in FIG. 6, the flow includes the following steps (Step 602-Step 610):

Step 602: UE initiates a DHCPv4 address request, and the AC supporting a DHCP Server function allocates a private IPv4 address to the UE.

Specifically, the AC judges whether the UE passes authentication or not according to a MAC address carried in the address request, and allocates the private IP address to the UE if the UE passes authentication. The AC supports an NAPT function, and converts the private IP address allocated to the UE into a corresponding public IP address and a port set.

Step 604: after the address is successfully allocated, the AC initiates an Accounting-Request message, and transmits the Accounting-Request message to a BNG, wherein at least one of the following is carried in the Accounting-Request message: the public IP address and port set of the UE, the user identity of the UE, the MAC address of the UE.

Step 606: the BNG generates a new Accounting-Request message for the UE after receiving the Accounting-Request message from the AC, and transmits the new Accounting-Request message to an AAA server.

Step 608: the BNG returns an Accounting-Response message to the AC. Step 606 and Step 608 can be executed in an unfixed sequence.

Step 610: the AAA server returns an Accounting-Response message to the BNG, and accounting is started.

The accounting starting flows are introduced before, and after the UE is authenticated and the BNG receives the Accounting-Request message used for activating the BNG to execute the accounting operation from the AC, the BNG starts executing the accounting operation. An intermediate accounting flow for the BNG is introduced below.

Figure 7:
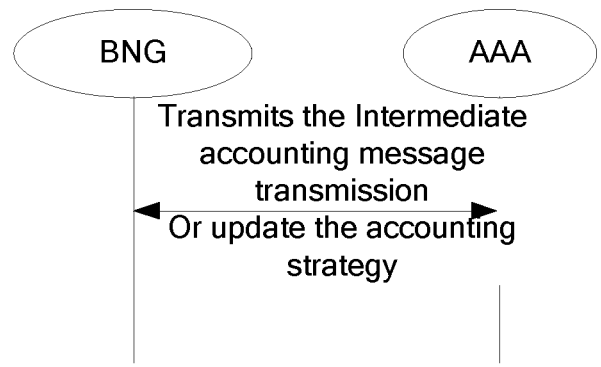
FIG. 7 is a flowchart of an intermediate accounting flow according to an embodiment of the disclosure.

FIG. 7 is a flowchart of an intermediate accounting flow according to an embodiment of the disclosure, and as shown in FIG. 7, a BNG reports intermediate accounting data to an AAA server according to an accounting strategy, and the AAA server gives a response. Wherein, an AC does not participate in substantial accounting data collection and reporting, and only serves as a triggering factor for the starting of accounting, that is, there is no accounting strategy for UE on the AC. Or, the AAA server transmits a new accounting strategy, and the BNG performs strategy updating, and executes an accounting operation according to the new accounting strategy.

Figure 8:
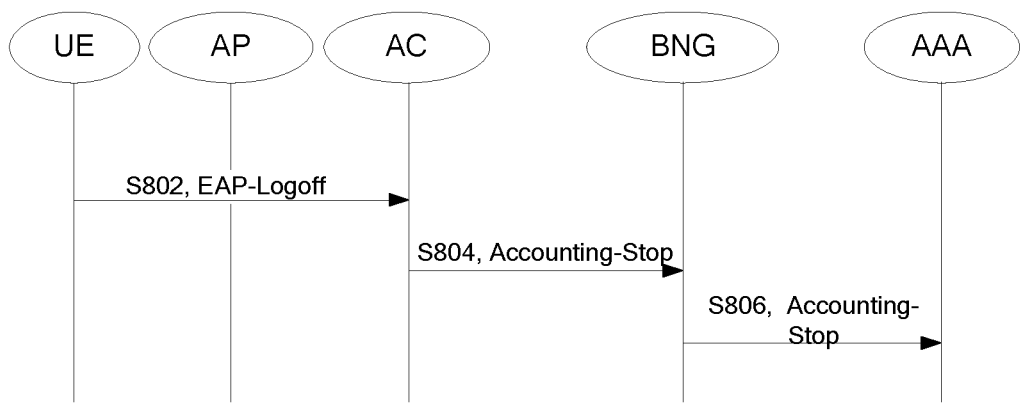
FIG. 8 is a flowchart of an accounting stop flow according to an embodiment of the disclosure.

After the BNG finishes executing the accounting operation, an accounting stop flow is introduced below, and in the accounting stop flow, the AC transmits an Accounting-Stop message to the BNG, wherein the Accounting-Stop message is used for activating the BNG to stop the accounting operation. FIG. 8 is a flowchart of an accounting stop flow according to an embodiment of the disclosure, and as shown in FIG. 8, the flow includes the following steps of (Step 802-Step 806):

Step 802: UE initiates an EAP_Logoff frame to notify logoff.

Step 804: an AC transmits an Accounting-Stop message to a BNG, wherein, in a scenario of presence of NAPT on the AC, at least one of the following is carried in the Accounting-Stop message: the public IP address and port set of the UE, the user identity of the UE, the MAC address of the UE; and in a scenario of absence of NAPT on the AC, at least one of the following is carried in the Accounting-Stop message: the IP address of the UE, the user identity of the UE, the MAC address of the UE.

Step 806: the BNG generates a new Accounting-Stop message for the UE after receiving the Accounting-Stop message from the AC, and transmits the new Accounting-Stop message to an AAA server, and counting is ended.

Figure 9:
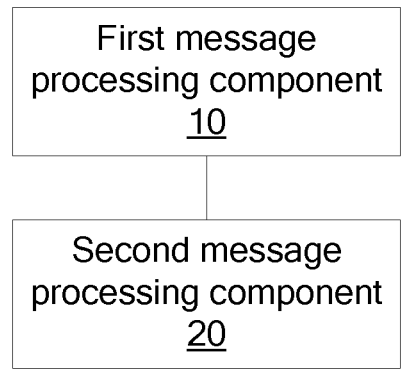
FIG. 9 is a structure diagram of an accounting device according to an embodiment of the disclosure.

An accounting device corresponding to the accounting method is provided in the embodiment of the disclosure, and the device is generally arranged on a BNG side, and is configured to implement the embodiment. FIG. 9 is a structure diagram of an accounting device according to an embodiment of the disclosure, and as shown in FIG. 9, the device includes: a first message processing component 10 and a second message processing component 20. The structure is described below.

The first message processing component 10 is configured to transmit a second Accounting-Request message to an AAA server after receiving a first Accounting-Request message from an AC, wherein the first Accounting-Request message is used for activating a BNG to execute an accounting operation; and the second message processing component 20 is connected to the first message processing component 10, and is configured to transmit a second Accounting-Stop message to the AAA server after receiving a first Accounting-Stop message from the AC, wherein the first Accounting-Stop message is used for activating the BNG to stop the accounting operation.

By the device, the AC only serves as a triggering factor for the starting and stopping the accounting operation, the first message processing component 10 transmits the second Accounting-Request message to the AAA server after receiving the first Accounting-Request message from the AC, and the second message processing component 20 transmits the second Accounting-Stop message to the AAA server after receiving the first Accounting-Stop message from the AC, wherein the first Accounting-Request message is used for activating the BNG to execute the accounting operation; and the first Accounting-Stop message is used for activating the BNG to stop the accounting operation. The problem that the function division of the AC and the BNG is not yet clear during the accounting operation in the related art is solved, so that functions of the AC and the BNG are clearly divided during the accounting operation, an accounting operation flow is further made clear, and the accounting efficiency is improved.

In the embodiment, the AC does not participate in substantial accounting data collection and reporting, and only serves as the triggering factor for the starting and stopping the accounting operation, that is, there is no accounting strategy for UE on the AC. An accounting starting process and an accounting stop process are respectively introduced below.

The accounting starting process and the accounting stopping process have been introduced before, and will not be repeated here. A preferred implementation mode corresponding to the accounting starting process and the accounting stopping process is provided in the embodiment of the disclosure, which are introduced before, FIG. 10 is a first specific structure diagram of an accounting device according to an embodiment of the disclosure, and as shown in FIG. 10, except each module shown in FIG. 9, the device further includes: an accounting-Response message transmission component 30, connected to the first message processing component 10 and configured to transmit an Accounting-Response message to the AC.

Figure 10:
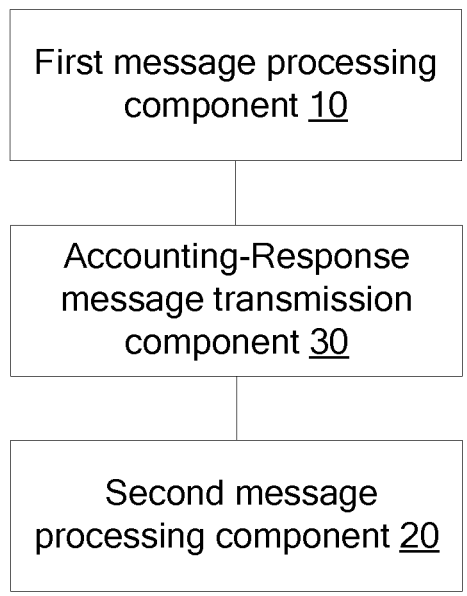
FIG. 10 is a first specific structure diagram of an accounting device according to an embodiment of the disclosure.
Figure 11:
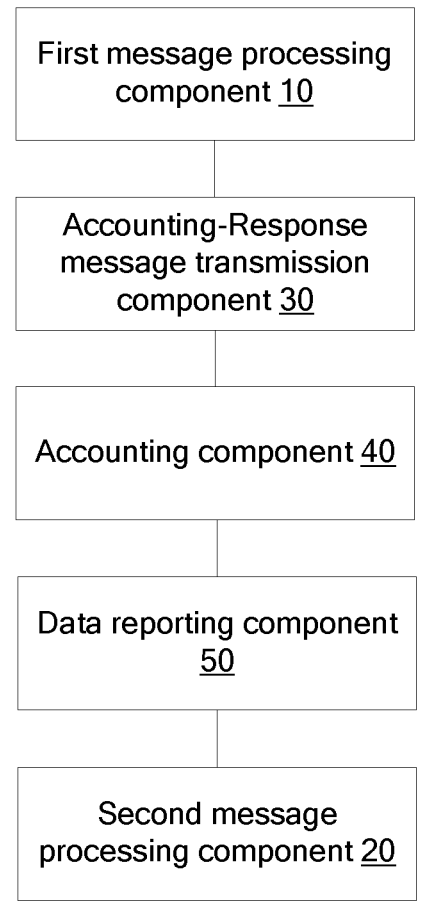
FIG. 11 is a second specific structure diagram of an accounting device according to an embodiment of the disclosure.

FIG. 11 is a second specific structure diagram of an accounting device according to an embodiment of the disclosure, and as shown in FIG. 11, except each module shown in FIG. 10, the device further includes: an accounting component 40, connected to the accounting-Response message transmission component 30 and configured to execute the accounting operation according to an accounting strategy; and a data reporting component 50, connected to the accounting component 40 and configured to report intermediate accounting data to the AAA server.

The accounting operation flow of the BNG has also been introduced before, a preferred implementation mode is provided in the embodiment of the disclosure, and the accounting component 40 includes: an accounting element, configured to receive a new accounting strategy from the AAA server and execute the accounting operation according to the new accounting strategy. The device further includes: a deleting component, configured to delete the accounting strategy.

In case of absence of NAPT on the AC, at least one of the following is carried in the first Accounting-Request message or the second Accounting-Request message: the IP address of the UE, the user identity of the UE, the MAC address of the UE; and in case of presence of NAPT on the AC, at least one of the following is carried in the first Accounting-Request message or the second Accounting-Request message: the public IP address and port set of the UE, the user identity of the UE, the MAC address of the UE.

In case of absence of NAPT on the AC, at least one of the following is carried in the first Accounting-Stop message or the second Accounting-Stop message: the IP address of the UE, the user identity of the UE, the MAC address of the UE; and in case of presence of NAPT on the AC, at least one of the following is carried in the first Accounting-Stop message or the second Accounting-Stop message: the public IP address and port set of the UE, the user identity of the UE, the MAC address of the UE.

From the description above, in the disclosure, the AC does not participate in substantial accounting data collection and reporting, and only serves as the triggering factor for the starting and stopping the accounting operation. When accounting is started, the AC transmits the Accounting-Request message to the BNG to trigger the BNG to execute the accounting operation, then the BNG starts executing the accounting operation, and the AC transmits the Accounting-Stop message to the BNG to trigger the BNG to stop the accounting operation. Therefore, the functions of the AC and the BNG are clearly divided during the accounting operation, the accounting operation flow is further made clear, and the accounting efficiency is improved.

Obviously, those skilled in the art should know that each module or step of the disclosure can be implemented by a universal computing device, and the modules or steps can be concentrated on a single computing device or distributed on a network formed by a plurality of computing devices, and can optionally be implemented by programmable codes executable for the computing devices, so that the modules or steps can be stored in a storage device for execution with the computing devices, or can form each integrated circuit module, or multiple modules or steps therein can form a single integrated circuit module for implementation. As a consequence, the disclosure is not limited to any specific hardware and software combination.

The above is only the preferred embodiment of the disclosure and not intended to limit the disclosure, and for those skilled in the art, the disclosure can have various modifications and variations. Any modifications, equivalent replacements, improvements and the like within the spirit and principle of the disclosure shall fall within the scope of protection of the disclosure.

What is claimed:

1. An accounting method, comprising:
    transmitting, by a Broadband Network Gateway (BNG), a second Accounting-Request message to an Authentication Authorization Accounting (AAA) server after receiving a first Accounting-Request message from an Access Controller (AC), wherein the first Accounting-Request message is used for activating the BNG to execute an accounting operation; and
    transmitting, by the BNG, a second Accounting-Stop message to the AAA server after receiving a first Accounting-Stop message from the AC, wherein the first Accounting-Stop message is used for activating the BNG to stop the accounting operation;
    wherein in case of absence of Network Address Port Translation (NAPT) on the AC, at least one of the following is carried in the first Accounting-Request message or the second Accounting-Request message: an Internet Protocol (IP) address of a UE, a user identity of the UE, a Media Access Control (MAC) address of the UE; and
    wherein in case of presence of NAPT on the AC, at least one of the following is carried in the first Accounting-Request message or the second Accounting-Request message: a public IP address and port set of the UE, a user identity of the UE, a MAC address of the UE.

2. The method according to claim 1, wherein before the BNG receives the first Accounting-Stop message from the AC, further comprising:
    receiving, by the AC, a logoff notification message from a User Equipment (UE).

3. The method according to claim 1, wherein after the BNG transmits the second Accounting-Request message to the AAA server, further comprising:
    transmitting, by the BNG, an Accounting-Response message to the AC.

4. The method according to claim 1, wherein before the BNG receives the first Accounting-Stop message from the AC, further comprising:
   executing, by the BNG, the accounting operation according to an accounting strategy, and reporting intermediate accounting data to the AAA server.

5. The method according to claim 4, wherein executing, by the BNG, the accounting operation according to the accounting strategy comprises:
   receiving, by the BNG, a new accounting strategy from the AAA server, and executing the accounting operation according to the new accounting strategy.

6. The method according to claim 4, wherein after the BNG receives the first Accounting-Stop message from the AC, further comprising:
   deleting, by the BNG, the accounting strategy.

7. The method according to claim 1, wherein
   in case of absence of NAPT on the AC, at least one of the following is carried in the first Accounting-Stop message or the second Accounting-Stop message: an IP address of the UE, a user identity of the UE, a MAC address of the UE; and
   in case of presence of NAPT on the AC, at least one of the following is carried in the first Accounting-Stop message or the second Accounting-Stop message: a public IP address and port set of the UE, a user identity of the UE, a MAC address of the UE.

8. An accounting device, comprising:
   a first message processing component, configured to transmit a second Accounting-Request message to an Authentication Authorization Accounting (AAA) server after receiving a first Accounting-Request message from an Access Controller (AC), wherein the first Accounting-Request message is used for activating a Broadband Network Gateway (BNG) to execute an accounting operation; and
   a second message processing component, configured to transmit a second Accounting-Stop message to the AAA server after receiving a first Accounting-Stop message from the AC, wherein the first Accounting-Stop message is used for activating the BNG to stop the accounting operation;
   wherein in case of absence of Network Address Port Translation (NAPT) on the AC, at least one of the following is carried in the first Accounting-Request message or the second Accounting-Request message: an Internet Protocol (IP) address of a User Equipment (UE), a user identity of the UE, a Media Access Control (MAC) address of the UE; and
   wherein in case of presence of NAPT on the AC, at least one of the following is carried in the first Accounting-Request message or the second Accounting-Request message: a public IP address and port set of the UE, a user identity of the UE, a MAC address of the UE.

9. The device according to claim 8, further comprising:
   an accounting-Response message transmission component, configured to transmit an Accounting-Response message to the AC.

10. The device according to claim 8, further comprising:
    an accounting component, configured to execute the accounting operation according to an accounting strategy; and
    a data reporting component, configured to report intermediate accounting data to the AAA server.

11. The device according to claim 10, wherein the accounting component comprises:
    an accounting element, configured to receive a new accounting strategy from the AAA server and execute the accounting operation according to the new accounting strategy.

12. The device according to claim 11, further comprising:
    a deleting component, configured to delete the accounting strategy.

13. The device according to claim 8, wherein
    in case of absence of NAPT on the AC, at least one of the following is carried in the first Accounting-Stop message or the second Accounting-Stop message: an IP address of the UE, a user identity of the UE, a MAC address of the UE; and
    in case of presence of NAPT on the AC, at least one of the following is carried in the first Accounting-Stop message or the second Accounting-Stop message: a public IP address and port set of the UE, a user identity of the UE, a MAC address of the UE.

* * * * *